United States Patent [19]

Seibert

[11] 4,162,146

[45] Jul. 24, 1979

[54] MULTI-CHAMBER ADSORBENT GAS FRACTIONATOR WITH NON-JAMMING EFFLUENT FLOW CONTROL VALVE

[75] Inventor: Chesterfield F. Seibert, Cortland, N.Y.

[73] Assignee: Pall Corporation, Glen Cove, N.Y.

[21] Appl. No.: 860,280

[22] Filed: Dec. 14, 1977

[51] Int. Cl.² .................................................. B01D 53/04
[52] U.S. Cl. ........................................... 55/163; 55/179; 55/208; 55/275; 55/389
[58] Field of Search ................... 55/33, 62, 74, 75, 163, 55/179, 208, 387, 389, 275; 137/112, 113

[56] References Cited

U.S. PATENT DOCUMENTS

| 315,521 | 4/1885 | Lord et al. | 137/113 |
|---|---|---|---|
| 1,938,369 | 12/1933 | Beebe | 137/113 |
| 2,501,755 | 3/1950 | Bent | 137/113 |
| 3,008,482 | 11/1961 | Hunter | 137/113 |
| 3,323,292 | 6/1967 | Brown | 55/163 X |
| 3,324,631 | 6/1967 | Kreuter | 55/163 |
| 3,448,561 | 6/1969 | Seibert et al. | 55/163 X |
| 3,464,186 | 9/1969 | Hankison et al. | 55/163 |
| 3,513,631 | 5/1970 | Seibert et al. | 55/179 X |
| 3,659,399 | 5/1972 | Kauer, Jr. et al. | 55/163 X |

*Primary Examiner*—Robert H. Spitzer

[57] ABSTRACT

Apparatus is provided for reducing the concentration of a first gas in a mixture thereof with a second gas to below a limiting maximum concentration thereof in the second gas, comprising an effluent flow control valve in the effluent line for directing the effluent gas from the chamber that is on-stream for adsorption; the effluent valve comprising a valve chamber having separate inlets and inlet passages leading thereinto, one from the effluent line from each sorbent chamber; a valve seat across each inlet; and a free-rolling ball valve responsive to effluent line gas pressure at each inlet related to downstream pressure to displace the ball and open the inlet leading from the sorbent chamber on-stream for adsorption, and direct the ball across the other inlet leading from the sorbent chamber off-stream for adsorption and close that inlet, thereby preventing effluent gas flow through that inlet into the off-stream chamber, and a bleed line for effluent purge flow, bypassing the closed inlet and interconnecting the inlet passages or one inlet passage or the valve chamber with one of the effluent lines for reverse purge flow of effluent gas through that effluent line into the sorbent chamber that is off-stream for adsorption but on-stream for regeneration, to regenerate the sorbent bed with such purge flow.

13 Claims, 9 Drawing Figures

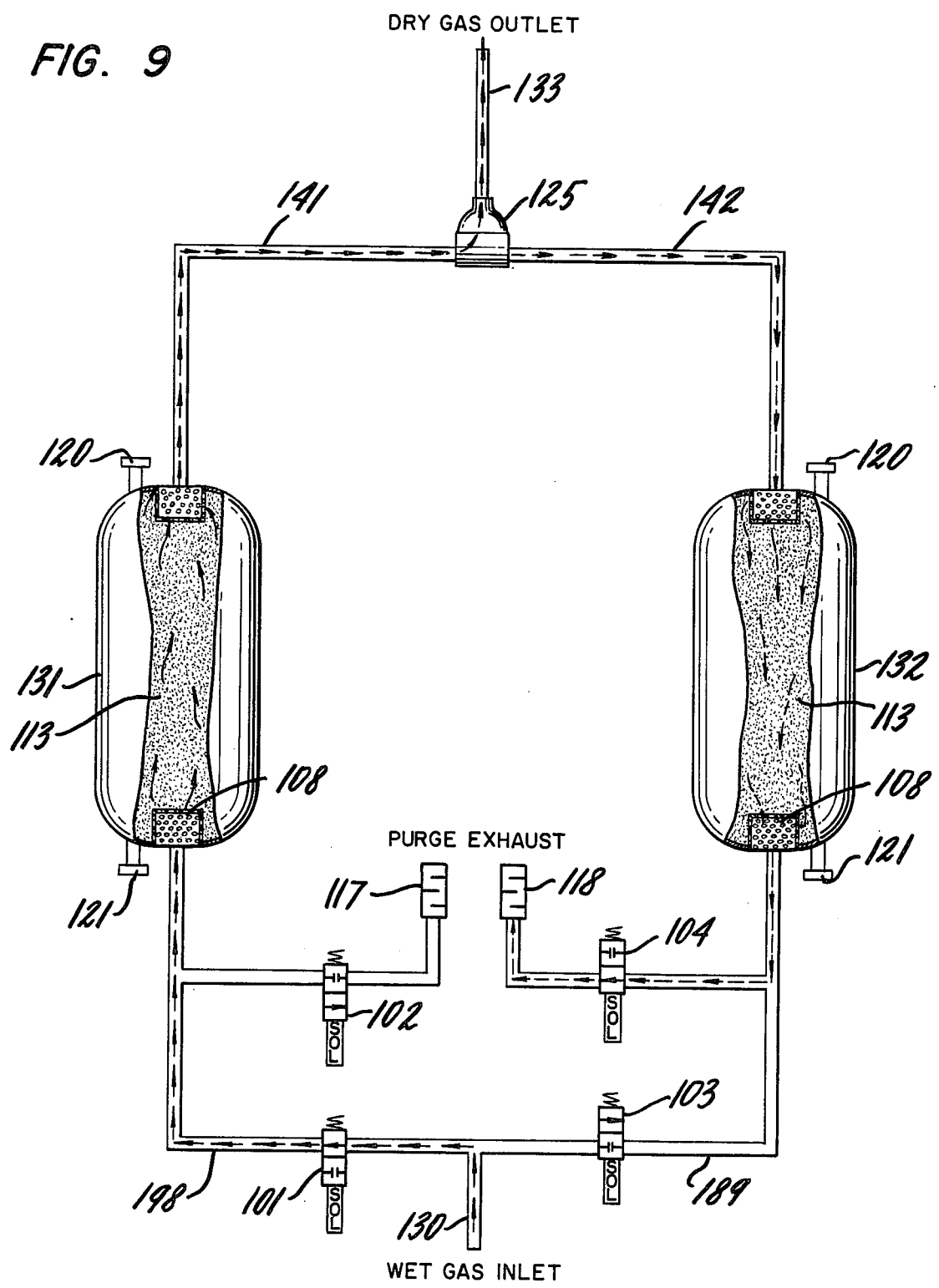

MULTI-CHAMBER ADSORBENT GAS FRACTIONATOR WITH NON-JAMMING EFFLUENT FLOW CONTROL VALVE

Adsorbent gas fractionators and particularly disiccant dryers have been marketed for many years and are in wide use throughout the world. The usual type has two sorbent beds, one of which is being regenerated while the other is on the adsorption cycle. The gas to be fractionated is passed through the one sorbent bed in one direction in the adsorption cycle, and then, at a predetermined time interval, when the sorbent can be expected to have adsorbed so much of the gas being adsorbed that there is a danger that the required low level of the effluent gas will not be met, the influent gas is switched to the other bed, and the spent bed is regenerated by heating and/or by evacuation and/or by passing purge effluent gas therethrough, usually in counterflow.

Such gas fractionators on the market today are of two general types, a heat-reactivatable type, in which heat is applied to regenerate the spent sorbent at the conclusion of the adsorption cycle, and a heatless type in which heat is not applied to regenerate the spent sorbent at the conclusion of the adsorption cycle, but which relies upon the use of a purge flow of adsorbent effluent gas from the bed on the adsorption cycle, which is passed through the spent bed at a lower pressure, with rapid cycling to conserve the heat of adsorption to aid in the regeneration of the spent bed. The use of a purge gas to regenerate at a lower pressure than the line pressure of the gas being dried is not, however, confined to heatless types, but was used in heat-reactivated sorbent fractionators for many years before the advent of the heatless type.

Both types are operated with fixed time fractionators and regenerating cycles, usually equal in duration, with the length of the cycles being fixed according to the volume of sorbent available and the amount of gas to be adsorbed. The time of the cycle is invariably fixed at much less time than might be permitted, in order to ensure that the effluent gas will always meet the system requirements. As the adsorption cycle proceeds, the sorbent bed becomes progressively more and more saturated from the inlet end towards the outlet end, and less and less capable of adsorbing first gas that is carried through it by the influent gas. Removal of first gas from the influent gas depends upon the rate of flow of the gas and the rate of first gas adsorption and first gas content of the adsorbent, as well as the temperature and pressure of gas within the bed. The rate of adsorption by the sorbent may decrease as the sorbent becomes loaded.

When the sorbent bed is regenerated, the pressure in the bed is reduced, sometimes considerably, depending upon the line pressure of the gas flow being fractionated. Sometimes it is even desirable to draw a vacuum on the bed, to enhance the removal of the sorbed gas from the bed during the regeneration. Since line pressure is almost invariably above atmospheric pressure, it is customary to permit the pressure in the bed to return to line pressure at a late stage of the regeneration portion of the cycle. When regeneration is complete, the bed (which has been repressurized) is then ready to be put on-stream, for another adsorption cycle.

Sorbent beds are normally made of particulate friable material, which is subject to a good deal of attrition in the course of gas flow through it. Since purge flow is normally countercurrent to adsorption flow, this means that the gas flow through the chamber is reversed during the regeneration cycle, and with the change in direction of the gas flow, and the change in pressure between the cycles, the particulate material has a tendency to become reduced in particle size, and the fines that are liberated are carried downstream by the effluent gas flow from the bed, and form a layer of dust on parts and walls downstream.

In addition to being friable, sorbent materials are also frequently hard and abrasive. Alumina is an example. The result is that fines entrained in the effluent gas flow and carried downstream as dust can enter and interfere with the valves controlling not only the flow of effluent gas from the two chambers but also the flow of influent gas into the two chambers, because of the countercurrent purge flow, where purge is used. The result is a considerable wear and tear on valve parts, which can have a rather short life, particularly when abrasive materials such as alumina are employed as the desiccant.

The fine particles of the sorbent bed carried downstream can lead to obstruction of the valve parts, with the result that the valves may not fully close, or may not fully open, with disadvantageous effect on the cycling of the gas flow through the sorbent beds. This problem has arisen with many types of valves that have previously been utilized in adsorption gas fractionators.

In adsorbent gas fractionators, the influent and effluent gas flow control valves can be of the four-way type, interconnecting, in the case of the influent valve, the influent line with one of the two sorbent beds, and also interconnecting the gas vent line for venting to the atmosphere purge (regenerating) flow from the bed that is off-stream for adsorption, but on-stream for regeneration. Thus, the valve always connects one of the chambers to the gas vent line and one to the influent gas line, and is always open to receive fines. Similarly, the effluent gas flow control valve interconnects the delivery line with the line for effluent gas from the sorbent bed that is on-stream and is always open to the effluent line from the chamber that is on-stream, as well as to the line leading to the other chamber that is on-stream for regeneration, for a small purge flow bled off the effluent gas, for regeneration.

If four two-way valves are used instead of two four-way valves, the valves used as the purge exhaust valves will receive fines.

Such flow control valves have been of the flutter valve type, the rotating cylinder valve type, the poppet valve type, and the four-way piston-and-cylinder valve type, with reciprocable piston or cylinder valve elements. All of these valves have valve elements and associated moving parts that follow a fixed path or track, with a close clearance between moving parts, to ensure sealing of the valve when closed. Such valves, particularly the valves of the piston-and-cylinder type, are subject to jamming by fine abrasive particles or dust that collect in the close clearances and are too hard and abrasive to be crushed and moved out of the way.

In accordance with the instant invention, a valve is provided, suitable for use as the effluent flow control valve in a multi-bed adsorbent gas fractionator, comprising a valve chamber having separate inlets leading thereinto, one from each sorbent chamber; a valve seat across each inlet; and a free-rolling ball valve responsive to effluent line gas pressure at each inlet related to downstream gas pressure to displace the ball and open the inlet leading from the sorbent chamber on-stream for adsorption, and shift the ball into position across the other inlet leading from the sorbent chamber off-stream for adsorption and close that inlet thereby preventing unlimited effluent gas flow through that inlet into the off-stream chamber.

A bleed line for effluent purge gas flow can be provided, bypassing the closed inlet, and interconnecting the inlet passages or one inlet passage or the valve chamber with the effluent lines for limited reverse purge flow of effluent gas through the effluent line into the sorbent chamber that is off-stream for adsorption but on-stream for regeneration, to regenerate the sorbent bed with such purge flow, and this bleed line can be provided with a valve for adjusting bleed flow therethrough.

Since the flow control valve of the invention utilizes a free-rolling ball which is not restricted to a confined path with a close clearance between the ball and a track or valve guide, the valve is not subject to obstruction by particulate material carried downstream. Movement of the valve from its valve seat at the time the valve is opened is quick, substantially instantaneous when the gas pressure differential across the ball is sufficient, and the ball virtually blows out of the valve seat when the valve opens, blowing with it any fine particulate material or dust that may happen to be in the vicinity of the valve seat, thus keeping the valve seat clean for reseating the valve, and at the same time blowing away any particulate material that may have accumulated around the ball during the period when it was closed. Thus, this valve is not only clean but also self-cleaning, and therefore not subject to obstruction. It is for this reason useful across the effluent gas line. The effluent gas valve is subject to obstruction by the fines carried downstream by the gaseous effluent from the bed on the adsorption cycle.

The invention accordingly provides multi-chamber adsorbent gas fractionators with a non-jamming effluent purge flow control valve, for reducing the concentration of a first gas in a mixture thereof with a second gas to below a limiting maximum concentration thereof in the second gas, comprising, in combination, a pair of vessels; a chamber in each vessel for a bed of particulate friable sorbent having a preferential affinity for the first gas; an influent line for delivering influent gas to each sorbent chamber; an influent flow control valve in the influent line for directing the influent gas to the one of the chambers that is on-stream for adsorption; an effluent line for delivering effluent gas from each sorbent chamber; an effluent purge flow control valve in the effluent line for directing the effluent gas from the chamber that is on-stream for adsorption; the effluent valve comprising a valve chamber having separate inlets leading thereinto, one from the effluent line from each sorbent chamber; a valve seat across each inlet; and a free-rolling ball valve responsive to effluent line gas pressure at each inlet related to downstream pressure to displace the ball and open the inlet leading from the sorbent chamber on-stream for adsorption, and direct the ball across the other inlet leading from the sorbent chamber off-stream for adsorption and close that line, thereby preventing effluent gas flow through that inlet into the off-stream chamber.

A bleed line for effluent purge gas flow can be provided, bypassing the closed inlet and optionally interconnecting one or both of the passages or one passage and the valve chamber with one of the effluent lines for reverse purge flow of effluent gas through that effluent line into the sorbent chamber that is off-stream for adsorption but on-stream for regeneration, to regenerate the sorbent bed with such purge flow, and this bleed line can be provided with a valve for adjusting bleed flow therethrough.

The ball valve and valve seat can be of any suitable material. Metal balls are useful, particularly of corrosion-resistant material, such as stainless steel, brass, bronze, nickel-plated steel, and stainless alloys. Magnetic balls and seats of which at least one is a magnet and the other a magnet or magnetically attracted material, such as Alnico alloy, iron, are advantageous in aiding in seating of the ball on the seat in a sealing relationship. Plastic materials can be used, such a polyethylene, polypropylene, polystyrene, polyesters, polyvinyl chloride, polyamide, polytetrafluoroethylene, phenol-formaldehyde, urea-formaldehyde and polycarbonate resins. Resilient plastic materials such as natural and synthetic rubbers can also be used.

The invention is applicable to adsorbent gas fractionators which do not utilize heat to regenerate the sorbent bed, i.e., heaterless systems, and also to adsorbent gas fractionators where either all or only a part of the sorbent bed is heated to effect regeneration, as well as to systems wherein regeneration is effected at reduced pressure, and to systems utilizing a purge gas flow, and to systems combining one or more of these features.

If the apparatus includes means for applying heat during such regeneration, all of the bed can be heated, or, alternatively, such means can be limited to only that portion of the sorbent bed having a high moisture content, of the order of 20% of its moisture capacity or higher, at the conclusion of a drying cycle, i.e., to only that portion first contacted by influent flow during a drying or adsorption cycle. In this case, the remainder of the sorbent bed is not heated during regeneration, and consequently no heating means are provided therein. The unheated proportion of the bed volume can accordingly be as large as desired. Usually from one-fourth to three-fourths of the bed volume, preferably from one-third to two-thirds of the volume, will be heated, in this embodiment.

In effect, the unheated portion of such a bed constitutes a reserve bed, which in the normal adsorption cycle may not be required at all, and in which in any case the sorbent is apt to adsorb only a relatively small proportion, less than 20%, of its capacity of sorbed first gas, but which is present in order to prevent the delivery of effluent gas of undesirably high first gas content in the unlikely event that first gas is not sufficiently adsorbed in the portion of the bed provided with heating means. The first gas adsorbing capacity of the reserve portion of the bed is so little used that the reserve sorbent is regenerated by the purge flow, whether or not the purge flow is heated, and any first gas carried forward from this portion by purge flow therethrough is of course effectively removed from the bed after passage through the heated portion thereof.

While the apparatus of the invention is normally composed of only two sorbent beds, the apparatus can include three or more sorbent beds, as required, for special purposes, with valves in accordance with the invention at least at the effluent gas flow control points of the beds.

The apparatus of the invention is illustrated in the following drawings, in which:

FIG. 9 is a schematic view of a two-bed heatless desiccant dryer in accordance with the invention, utilizing the flow control valve of FIGS. 5 and 6.

Figure 1:
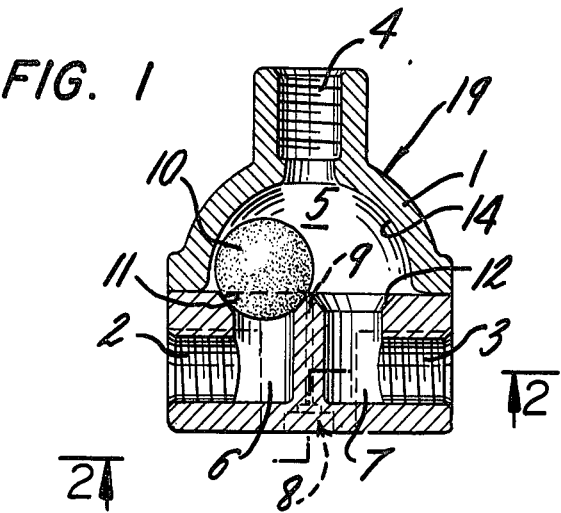
FIG. 1 is a longitudinal sectional view of one type of flow control valve in accordance with the invention, including a bleed line for purge flow bypassing the valve in each of its two closed positions.
Figure 2:
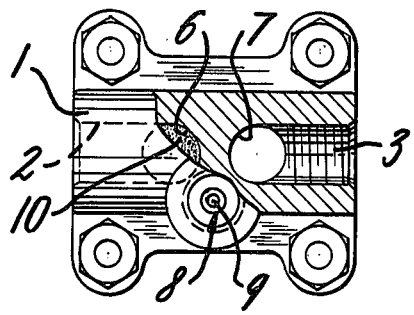
FIG. 2 is a cross-sectional view of the valve of FIG. 1, taken along the line 2—2 of FIG. 1.

The free-rolling ball shuttle valve shown in FIGS. 1 and 2 is used when oriented horizontally as shown, and has a housing 1 made of cast aluminum with inlet ports 2, 3 and outlet port 4. The ports 2, 3 are in flow communication with the valve chamber 5 via flow passages 6, 7, set at an angle of 90° to the line of flow through the inlets, so as to direct effluent gas flow from ports 2, 3 upwardly into the valve chamber. The orientation of the valve is critical, and should be as shown in the drawings, for reasons that will presently be seen.

The base of the housing 1 has a port 8 communicating with a narrow bleed line or passage 9 extending into the chamber 5. The port can be connected with a purge adjusting valve leading to purge check valves, and sorbent chambers, and the combination serves as a pressure-reducing bleed flow passage, to conduct reverse purge flow at reduced pressure to the sorbent bed-off stream and being regenerated.

The movable valve element is a free-rolling ball 10 made of rubber, plastic or other suitable material. The ball resists being unseated except at differential fluid pressure across the ball equal to or slightly less than the difference between effluent gas pressure at the inlet port and downstream pressure in the valve chamber 5. Thus, while there is no flow in the line across which the ball rests, the ball can remain seated at the valve seat 11, 12. However, as soon as gas flow starts in the line communicating with that inlet, pressure upstream of the ball increases, and eventually exceeds the differential pressure across the ball at which the ball is unseated, whereupon the ball literally is blown upwardly, away from the valve seat. The ball then proceeds to roll into position across the other valve seat, closing off the other line. It is aided in entering this seat and closing off the line by the gas flow into that line by the lower pressure in that line, and by the sloping contour of the valve chamber side wall 14. The seated ball prevents backflow through that line, directing flow from the inlet port to the outlet port of the valve chamber 5, and thus, to the effluent gas delivery line of the fractionator.

In operation, the ball changes position from one line to the other, being shifted from the line carrying the flow as soon as flow begins. When the flow is cut off from one line and begun in another, the ball is immediately blown from its seat, opening that line, as soon as the effluent line pressure upstream of the ball and therefore the differential pressure across the ball is reached at which the ball can be unseated, and the ball then closes off the other line, and remains in that position until the flows are reversed.

Because the valve is blown off its seat, any material which happens to collect on the seat is also blown away, with the result that each seat is cleaned on each shift of the ball, and remains clean until the change in cycle, when the ball can be blown back to the clean seat from its position closing off the other line. The material blown with the ball from the seat is carried by the effluent flow to the outlet line from the valve chamber, and there is no tendency of this material to fall with the ball when the ball reaches its new position. However, as flow continues in the new cycle, material can accumulate around the seated ball. This material does not interfere with the seating of the ball, since the ball has already been seated, and when the cycle changes again, this material will be cleared away when the ball has been blown away from the valve seat. Thus, the cleaning cycle is repeated, too, with each change in position of the ball.

In each position of the valve, bleed flow passage 9 bypasses the closed valve passage inlet, and provides a purge flow at all times from valve chamber 5 via port 8 to the sorbent bed being regenerated.

Figure 3:
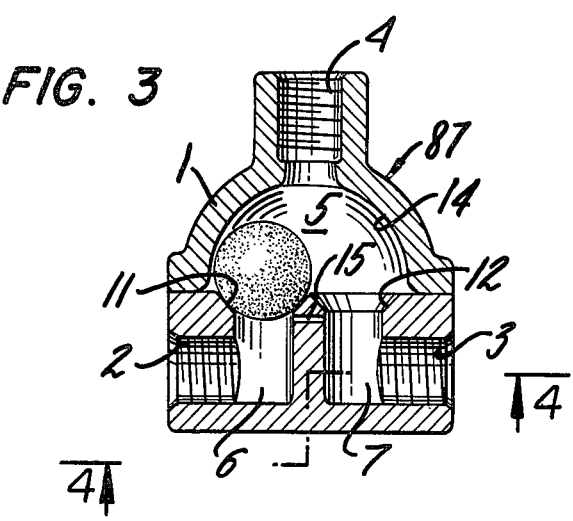
FIG. 3 is a longitudinal sectional view of another type of flow control valve in accordance with the invention, in which the bleed line interconnects the inlets leading from each of two sorbent chambers.
Figure 4:
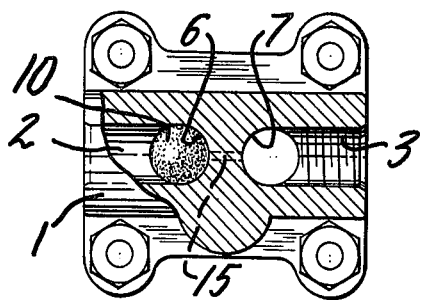
FIG. 4 is a cross-sectional view taken along the line 4—4 of the device of FIG. 3.

The free-rolling ball valve of FIGS. 3 and 4 is similar to that of FIGS. 1 and 2, with the exception that the pressure-reducing bleed flow passage 15 of fixed dimensions intercommunicates the passages 6, 7. Thus, whichever of passages 6, 7 is closed off by the ball nonetheless can receive and carry back effluent gas in reverse purge flow, which enters the closed passage 6, 7 through the bleed flow passage 15. The dimensions of the bleed flow passage are chosen according to the flow capacity desired, i.e., the amount of purge flow at the effluent gas pressure and flow expected through the system. While the dimensions of the bleed flow passage are fixed, it is suitable for a system with a limited range of operating pressures.

Figure 5:
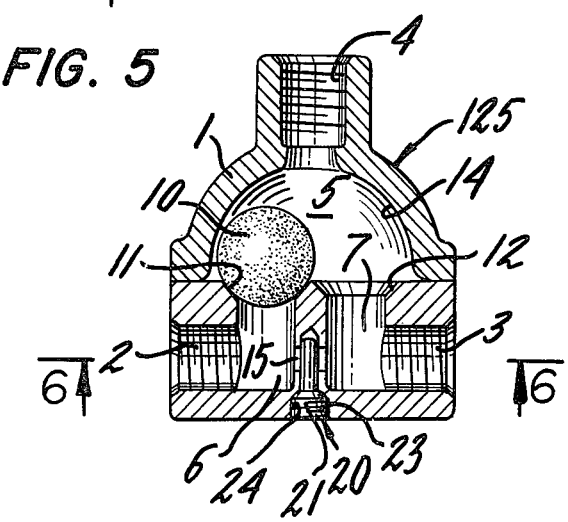
FIG. 5 is a longitudinal sectional view of a third type of flow control valve in accordance with the invention, utilizing a bypass bleed line as in FIG. 3 with a needle valve therein for controlling flow through the bleed line.
Figure 6:
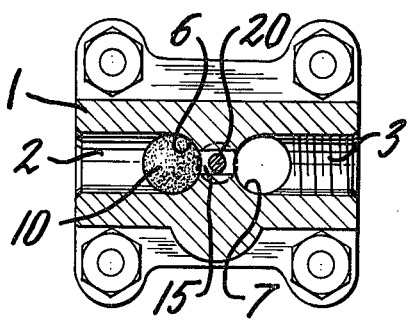
FIG. 6 is a cross-sectional view taken along the line 6—6 of FIG. 5.

The valve structure of FIGS. 5 and 6 is especially designed to accommodate systems where the purge flows can be expected to be variable, requiring adjustment of the open volume/area of the bleed flow passage, from time to time. This bleed flow passage is provided with a needle valve 20, which moves across the passage and reduces the passage to an annulus, with flow proceeding on either side of the needle valve.

As seen in FIGS. 5 and 6, the needle valve 20 is provided with either a round head cap screw or an Allen head cap screw 21 for tool-aided rotation and adjustment of position of the valve. The valve has a threaded shaft 23, which threads into the socket 24 in the valve housing. Thus, rotating the valve in one direction or the other threads it further into the housing or out from the housing, thus increasing or reducing the amount of obstruction it offers to the flow of gas through the bleed flow passage 15. Thus, the flow capacity of the bleed passage can be effectively controlled within a certain range by adjustment of the needle valve.

Figure 7:
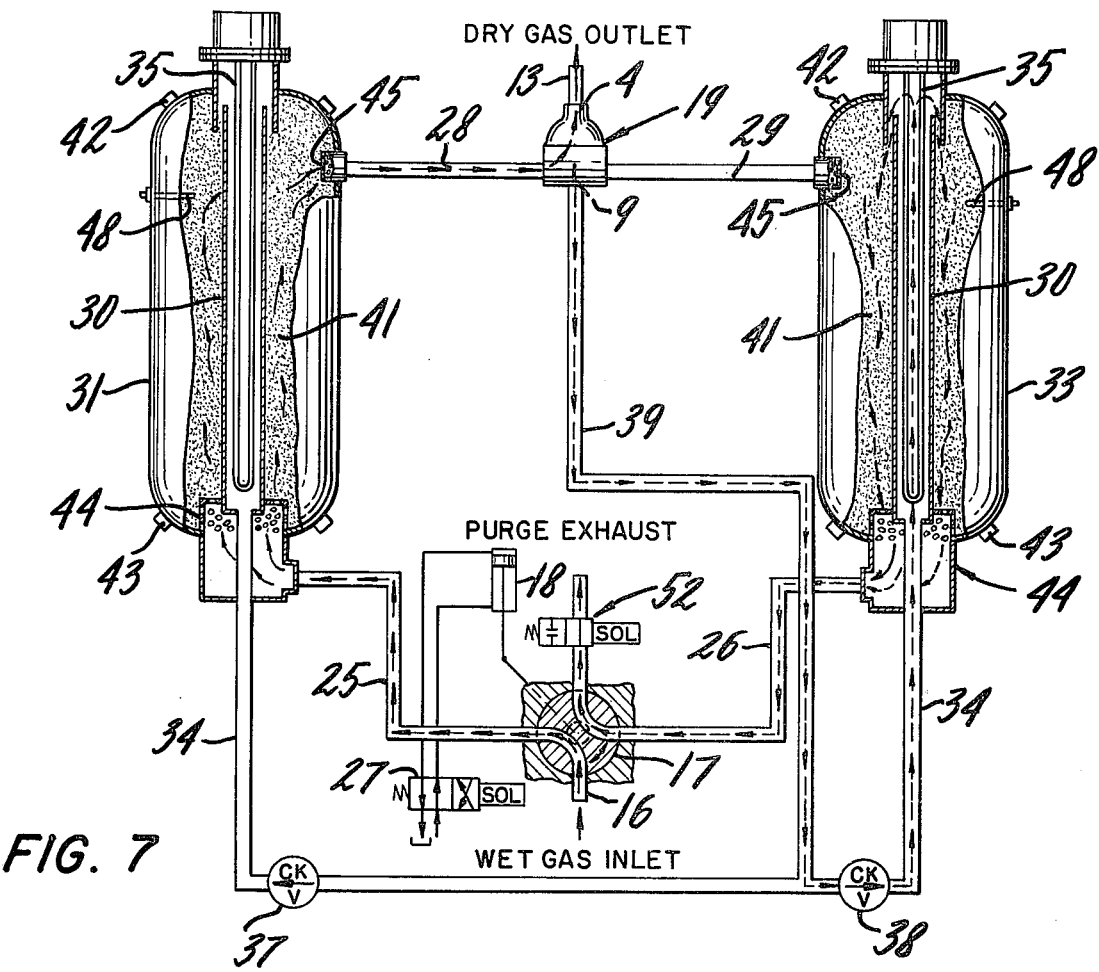
FIG. 7 is a schematic view of a two-bed heat-reactivatable desiccant dryer in accordance with the invention, utilizing the flow control valve of FIGS. 1 and 2.
Figure 8:
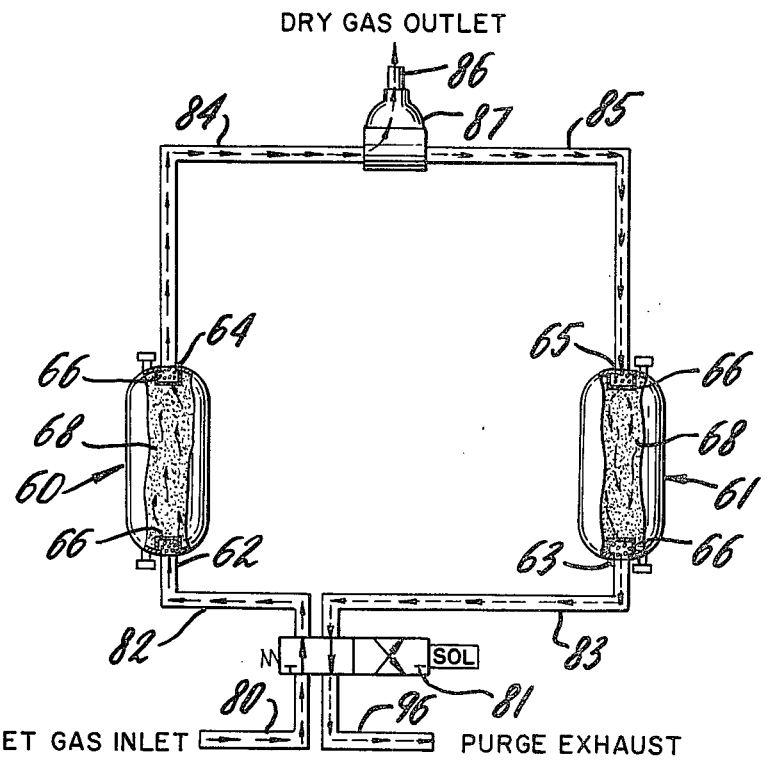
FIG. 8 is a schematic view of a two-bed heatless desiccant dryer in accordance with the invention, utilizing the flow control valve of FIGS. 3 and 4.

These valves are designed to be utilized as effluent purge flow control valves in adsorbent gas fractionators, of which three embodiments are illustrated in FIGS. 7 to 9, which will now be described.

The desiccant dryer of FIG. 7 is designed to regenerate a spent desiccant bed by a heated effluent gas purge. For this purpose, an electric heater 35 is provided through which a line 30 passes in flow connection with line 34 leading to the bottom of either vessel 31, 33 from the valve 19 and bleed flow passage 9 via the check valves 37, 38 and line 39.

The dryer is composed of a pair of sorbent vessels 31, 33 which are disposed vertically. Each vessel contains a bed of sorbent 41, such as alumina or silica gel. Also provided in the vessels are sorbent fill and drain ports 42, 43 for draining or filling of sorbent in the vessels. At the bottom of each vessel is a sorbent support 44, made of perforated stainless steel sheet, and at the top of the vessel at the outlet therefrom is a filter screen 45, which may be removable, and is made of stainless steel wire mesh or perforated stainless steel sheet. These screens retain the larger sorbent particles which might otherwise be carried out from the vessels when the vessels are on-stream, and keep the remainder of the system clean of such particles, but of course they do not screen out dust and fines.

The system includes an inlet line 16 leading to a four-way valve 17, switched by actuator 18, which is actuated according to moisture content of effluent gas from the vessel on-stream. Thus valve 17 directs the flow of influent gas to one of two inlet lines 25 and 26, leading the influent gas to the bottom of each vessel 31, 33. The four-way valve also directs purge flow from the off-stream vessel being regenerated to the pneumatically or electrically actuated purge exhaust valve 52.

The check valves 37, 38 ensure unidirectional flow to either vessel 31 or 33, whichever is on-stream for regeneration. The on-stream bed is at higher pressure than the pressure in the line before the check valves, and the off-stream bed is at lower pressure; thus, flow proceeds only through the check valve to the off-stream bed.

At the top of each vessel 31, 33 is an outlet line 28, 29, both leading to the free-rolling ball shuttle valve 19, which is of the type of FIGS. 1 and 2.

The valve 17 is operated by the compressed air cylinder 18, reciprocated by air pressure controlled by the solenoid valve 27, according to a signal given by the moisture sensors (not shown). Valve 19 simply responds to the change in flow through the vessels 31, 33, when the valve 17 is switched. From valve 19 at outlet port 4 extends the effluent gas delivery line 13, to deliver the dried effluent gas from the dryer to the system being supplied therewith.

Disposed within each vessel 31, 33 at a point approximately six inches before the outlet lines are each of a pair of moisture sensing gas probes 48, sampling the gas in the bed at that point, and conducting it past selector valves to a sensor (not shown) for determination of moisture content therein as in U.S. Pat. No. 3,448,561, and vented. The sensor at a predetermined maximum moisture content signals solenoid valve 27, and actuator 18, which switches valve 17.

A timer is provided (not shown) to actuate valve 17 at the end of a predetermined time interval. However, the sensor is connected to an electric relay (not shown) which, while the sensor is sensing dry air, permits the timer to complete its cycle, and then cuts it off before it can actuate valve 17. The actuator 18 thus is not actuated until the sensor senses wet air of the predetermined moisture content, whereupon the timer is restarted, and valve 17 is promptly switched.

The operation of the dryer is as follows: Wet influent gas at line pressure is introduced through line 16 to the four-way switching valve 17, where it is cycled to one of the vessels 31 or 33. If vessel 31 is on the drying cycle, the four-way switching valve 17 is set to divert the influent gas through line 25 to the bottom of vessel 31. The influent gas passes upwardly through the desiccant support 44 and through the sorbent bed 41 to the top, the moisture being adsorbed on the desiccant as it does so, and the dry gas passes to and through the outlet line 28, to the free-rolling ball shuttle valve 19. When the differential pressure across the ball reaches the predetermined limit, it blows ball 10 off its seat, opening the line from vessel 31, and closing the line to vessel 33, and gas flow then proceeds through valve chamber 5 and outlet 4 to the delivery line 13.

As the gas flows through the bed 41, the moisture content of the gas flowing through the bed is continuously sensed by the probe 48.

The dryer continues on this cycle until the sensor has sensed in the gas being dried in vessel 31 the predetermined moisture level at which the moisture front is about to leave the bed, whereupon the timer is re-energized and actuates valve 27 to reciprocate the piston of cylinder 18, switching valve 17 to the next 90° position. This diverts the influent gas entering via line 16 from line 25 to line 26, to enter the bottom of the second vessel 33; effluent gas flow leaves the top of vessel 33 via line 29. When such effluent flow reaches the valve 19 the ball 10 is blown off its seat, opening the line from vessel 33, and closing the line to vessel 31, and proceeds then through valve chamber 5 and outlet 4 to delivery line 13.

Purge gas from the valve 19 is now conducted through the line 34 to the bottom of vessel 31, whence it passes upwardly through the heater 35 and then downwardly through the sorbent bed 41 in the sorbent chamber of vessel 31, emerging at the bottom of the vessel, and then passes through line 25 and valve 17 to the purge exhaust 52.

This cycle is then continued until the sensor has sensed the predetermined maximum permissible moisture level in the effluent gas from the vessel 33, whereupon the timer is once more reenergized, the valve is turned 90° to its original position, and the first cycle repeated.

In the dryer shown in FIG. 8, heat is not utilized to regenerate spent desiccant.

The desiccant dryer shown in FIG. 8 is composed of a pair of vessels 60 and 61, each having at one end an inlet 62 and 63, and at the other end an outlet 64 and 65. Disposed across the outlets of each are stainless steel support screens 66, made of wire mesh or perforated steel plate, the purpose of which is to retain the desiccant particles within the tanks, but of course they do not screen out fines and dust.

The vessels are filled with desiccant 68, for example, activated alumina.

The vessels 60 and 61 are interconnected by a system of lines, to ensure delivery of influent gas to be dried to the inlet of either bed, and the withdrawal of dried gas from the outlet of either bed, with lines for directing purge flow bed off from the effluent to the top of either bed for regenerating and to vent it to atmosphere after leaving the bottom of each bed. This system is composed of a wet gas delivery line 80, which conducts wet gas to the four-way solenoid switching valve 81, and then through either line 82 or 83 to the bottom of vessels 60 and 61, respectively. Similar line connections 84 and 85 extend between the outlets at the top of the two vessels. Flow along these lines to outlet line 86 is controlled by the free-rolling ball shuttle valve 87, which is as shown in FIGS. 3 and 4. The lines 84,85 also carry purge flow in reverse direction, since they are each also in fluid flow connection with the bleed flow passage 15 of the ball shuttle valve. The bleed flow passage 15 controls the volume of purge flow bled from the dry gas effluent at the valve passages 6 or 7 for regeneration of the sorbent bed on the regeneration cycle, and reduces pressure to atmospheric beyond, when purge exhaust line 96 is open. The lines 84,85 lead the purge flow to one of the outlets 64 and 65 of vessels 60 and 61. A purge exhaust line 96 leads from the four-way valve 81 to vent purge to atmosphere.

If vessel 60 is on the drying cycle, and vessel 61 on the regenerating cycle, then operation of the dryer is as follows: Wet gas at line pressure entering through line 80, is diverted by valve 81 into line 82 to vessel 60, and passes thence upwardly through the desiccant bed 68 to the outlet 64, whence it is conducted via line 84 to ball shuttle valve 87. When flow in line 84 reaches valve 87, the ball 10 is blown from its seat, and shifted into position across line 85. Flow then proceeds via valve chamber 5 to the outlet line 86.

A portion of the effluent flow as controlled by the bleed flow passage 15 is then passed through line 85 to the top of the second vessel 61, which is on the regeneration cycle, and it passes thence downwardly through the bed to the inlet 63, and thence through the line 83 to the four-way switching valve 81, and is vented to the atmosphere through the purge exhaust line 96.

When the predetermined time has elapsed the four-way switching valve 81 is energized so as to divert influent gas to line 83 to the bottom of the second vessel 61 on the drying cycle, and opens purge exhaust valve 96. The dry effluent gas leaves the vessel 61 via line 85 and proceeds to the inlet of the ball shuttle valve 87. When flow in line 85 reaches valve 87, the ball 10 is blown from its seat and shifted to close off line 84. Effluent gas flow proceeds via valve chamber 5 to the delivery line 86. Purge flow now passes through line 84 to the top of the vessel 60, which is now on the regeneration cycle. This cycle continues until the predetermined time has expired whereupon the valve 81 is again switched, and the cycle is repeated.

In the dryer shown in FIG. 9 heat is not employed to effect regeneration of the spent desiccant.

The dryer is composed of two vessels, 131 and 132, fitted with suitable line connections for delivering wet gas influent and dry gas effluent to and from each vessel and with desiccant fill and drain ports 120 and 121, respectively. The desiccant 113 is supported on screen supports 108 in each tank. Control of wet gas influent flow from inlet line 130 is by solenoid switching valves 101,103 which direct the flow of influent gas either to line 198 or to line 189, and thence to the bottom of the vessels 131,132.

Dry gas effluent leaves the vessels at the top via one of lines 141 or 142, both of which are connected to the dry gas outlet line 133 via the free-rolling ball shuttle valve 125, which is of the type shown in either FIGS. 3 and 4 or FIGS. 5 and 6, according to whether an adjustable bleed flow is required.

Since the passage or orifice 15 of the shuttle valve is pressure-reducing, pressure-reducing orifices and check valves are unnecessary. Beyond the passage 15 pressure is reduced to atmospheric, when one of the purge exhaust valves 102, 104 and lines 117, 118 are open. The bleed line flow passage 15 also controls the volume of purge flow bled off the effluent gas for regeneration of the spent sorbent bed.

When a predetermined time has elapsed inlet switching valves 101, 103 and purge exhaust valves 102, 104 are energized.

If the left-hand vessel 131 is on the drying cycle, and the right-hand vessel 132 on the regenerating cycle, then the operation of the dryer proceeds as follows: Wet gas influent at, for example 100 psig., and a flow rate of 305 s.c.f.m., saturated at 80° F., enters through the inlet 130 into the line 198, valve 103 being closed, and then passes the valve 101, and enters the bottom of the first vessel 131, and thence upwardly through the bed of desiccant 113 therein, for example, activated alumina, to the outlet and via line 141 to the ball shuttle valve 125. This blows the ball valve 10 off its seat, opening line 141, and closing line 142, and then flow proceeds through valve chamber 5 to the dry gas outlet line 133. Effluent gas is delivered there at 100 psig. and 265 s.c.f.m., dewpoint −100° F. Shuttle valve 125 prevents free entry of dry gas into line 142. As purge flow, dry gas effluent at for example 40 s.c.f.m. is bled off through the pressure-reducing passage 15 where its pressure is reduced to atmospheric, and then through line 142 to the top of the second vessel 132, which is on the regeneration cycle. Purge flow passes downwardly through the desiccant bed 113, and emerges at the bottom into line 189, and thence passes through purge exhaust valve 104 to line 118, where it is vented to the atmosphere.

When time for complete regeneration has elapsed, the purge exhaust valve 104 is automatically shut off, and the chamber is repressured. This is done by a timer.

This cycle continues until the predetermined time has elapsed, whereupon the timer closes valve 101 to chamber 131 and opens valve 103 to chamber 132 while valve 125 opens automatically, so that wet gas influent entering through inlet 130 passes through line 189 to vessel 132, while dry gas effluent can now pass from the top of the vessel 132 via the line 142 to the dry gas delivery line 133, while the shuttle valve 125 prevents entry of dry gas into line 141. The flow of gas in the outlet line 141 is now reversed, and purge flows in line 141 from pressure-reducing bleed passage 15 to the top of chamber 131, which is on the regeneration cycle, and thence downwardly through the bed to the line 198, and thence through purge exhaust valve 102 where it is vented at line 117 to the atmosphere.

This cycle continues until the predetermined regeneration time cycle is completed, whereupon the timer closes purge exhaust valve 102 to repressurize vessel 131. The system continues with vessel 132 on the drying cycle until the predetermined time has elapsed, whereupon the timer energizes the valves and the cycle begun again.

Usually, the drying cycle is carried out with gas at a super-atmospheric pressure. The pressure-reducing bleed flow passage 15 in combination with the purge exhaust valves 102, 104 ensures that the regenerating cycle is carried out at a pressure considerably reduced from that at which the adsorption cycle is effected.

To ensure regeneration of the spent bed during the regenerating cycle, the time allotted by the timer and the volume of purge flow are adjusted according to the volume of desiccant, the moisture level at which the cycle is terminated, and the pressure at which the adsorption is effected, to ensure that regeneration can be complete within the allotted cycle time. Heatless dryers operate under equilibrium conditions, and the equilibrium conditions must be maintained under all of the conditions to which the dryer may be subjected in use.

The dryer systems of the invention can be used with any type of sorbent adapted to adsorb moisture from gases. Activated carbon, alumina, silica gel, magnesia, various metal oxides, clays, Fuller's earth, bone char, and Mobilbeads, and like moisture-adsorbing compounds can be used as the desiccant.

Molecular sieves also can be used, since in many cases these have moisture-removing properties. This class of materials includes zeolites, both naturally-occuring and synthetic, the pores in which may vary in diameter from about 3 to about 15 Å or more. Chabasite and analcite are representative natural zeolites that can be used. Synthetic zeolites that can be used include those described in U.S. Pat. Nos. 2,442,191 and 2,306,610. All of these materials are well known as desiccants, and detailed descriptions thereof will be found in the literature.

The dryers described and shown in the drawings are all adapted for purge flow regeneration with the purge passing in counterflow to the wet gas influent. This, as is well known, is the most efficient way of utilizing a desiccant bed. As a wet gas passes through a desiccant bed in one direction, the moisture content of the desiccant progressively decreases, and normally the least amount of moisture will have been adsorbed at the outlet end of the bed. It is consequently only sound engineering practice to introduce the regenerating purge gas from the outlet end, so as to avoid driving moisture from the wetter part of the bed into the drier part of the bed, and thus lengthen the regeneration cycle time required. If the purge flow be introduced at the outlet end, then the moisture present there, although it may be in a small amount, will be removed by the purge flow and brought towards the wetter end of the bed. Thus, the bed is progressively regenerated from the outlet end, and all the moisture is carried for the least possible distance through the bed before it emerges at the inlet end.

Nonetheless, for some purposes, it may be desirable to run the purge flow in the same direction as the influent flow. In accordance with the invention, it is possible to carry the moisture content of the desiccant to a very high level, much higher than is normally feasible, because of the protecting action of the humidity sensing element, when used, which makes it possible to cut off flow at a time more precisely gauged to moisture level than has heretofore been possible. Consequently, in many cases if the bed is brought nearly to the saturation point throughout, it will make little difference if the purge flow enters at the influent end or at the outlet end, and the invention contemplates both types of operation, although of course counterflow regeneration is preferred in most cases.

While the invention has been described with principal emphasis on a desiccant dryer and a process for drying gases, it will be apparent to those skilled in the art that this apparatus with a suitable choice of sorbent can be used for the separation of one or more gaseous components from a gaseous mixture. In such a case, the adsorbed component can also be removed from the sorbent by application of heat, and optionally, in addition, a reduction in pressure, during regeneration. Thus, the process can be used for the separation of hydrogen from petroleum hydrocarbon streams and other gas mixtures containing the same, for the separation of oxygen from nitrogen, for the separation of olefins from saturated hydrocarbons, and the like. Those skilled in the art are aware of sorbents which can be used for this purpose.

In many cases, sorbents useful for the removal of moisture from air can also be used, preferentially to adsorb one or more gas components from a mixture thereof, such as activated carbon, glass wool, adsorbent cotton, metal oxides and clays such as attapulgite and bentonite, Fuller's earth, bone char and natural and synthetic zeolites. The zeolites are particularly effective for the removal of nitrogen, hydrogen and olefins, such as ethylene or propylene, from a mixture with propane and higher paraffin hydrocarbons, or butene or higher olefins. The selectivity of a zeolite is dependent upon the pore size of the material. The available literature shows the selective adsorptivity of the available zeolites, so that the selection of a material for a particular purpose is rather simple and forms no part of the instant invention.

In some cases, the sorbent can be used to separate a plurality of materials in a single pass. Activated alumina, for example, will adsorb both moisture vapor and carbon dioxide, in contrast to Mobilheads which will adsorb only water vapor in such a mixture.

The apparatus employed for this purpose will be the same as that described and shown in FIGS. 7 to 9, inclusive, and the process is also as described, suitably modified according to the proportions of the components to be separated, the operating pressure and temperature and the volume of available sorbent.

It will, however, be understood that the process is of particular application in the drying of gases, and that this is the preferred embodiment of the invention.

Having regard to the foregoing disclosure, the following is claimed as the inventive and patentable embodiments thereof:

1. Apparatus for reducing the concentration of a first gas in a mixture thereof with a second gas to below a limiting maximum concentration thereof in the second gas, comprising, in combination, a pair of vessels; a chamber in each vessel for a bed of particulate friable sorbent having a preferential affinity for the first gas; an influent line for delivering influent gas to each sorbent chamber; an influent flow control valve in the influent line for directing the influent gas to the one of the chambers that is on-stream for adsorption; an effluent line for delivering effluent gas from each sorbent chamber; an effluent flow control valve in the effluent line for directing the effluent gas from the chamber that is on-stream for adsorption; the effluent valve comprising a valve housing; a valve chamber in the housing having separate substantially vertically oriented inlets and inlet passages leading thereinto, one from the effluent line from each sorbent chamber; a substantially horizontally oriented valve seat across each inlet; and a free-rolling ball valve seating against the valve seats and responsive to effluent line gas pressure at each inlet related to downstream pressure displacing the ball upwardly away from the valve seat into the valve chamber and opening the inlet leading from the sorbent chamber on-stream for adsorption, directing the ball to seat at the valve seat across the other inlet leading from the sorbent chamber off-stream for adsorption and close that inlet, thereby preventing effluent gas flow through that inlet into the off-stream chamber; and a bleed line in the housing for effluent purge gas flow bypassing the closed inlet and interconnecting at least one of the valve chamber and the substantially vertically oriented inlet passages with one of the effluent lines for reverse purge flow of effluent gas from the inlet passage with a change of flow direction from the direction of flow in the inlet passage and thence through the effluent line into the sorbent chamber that is off-stream for adsorption but on-stream for regeneration to regenerate the sorbent bed with such purge flow.

2. Apparatus according to claim 1, in which the bleed line is substantially horizontally oriented and interconnects two substantially vertically oriented inlet passages.

3. Apparatus according to claim 1, in which the bleed line is provided with a valve for adjusting bleed flow therethrough.

4. Apparatus according to claim 1, in which the bleed line interconnects the two inlet passages of the valve and one of the effluent lines.

5. Apparatus according to claim 1, in which the bleed line interconnects the valve chamber and one of the effluent lines.

6. Apparatus according to claim 1, comprising as the ball valve a free-rolling ball of plastic material.

7. Apparatus according to claim 6 in which the ball and valve seat are of resilient material.

8. Apparatus according to claim 1 comprising an effluent valve housing including a valve chamber in an upper portion of the housing with the inlets and inlet passages entering the valve chamber from below, and separated by a common wall of the housing; the bleed line extends through the common wall between the inlet passages, and the valve chamber wall adjacent each inlet slopes towards the inlet to direct a rolling ball valve into the valve seat across each inlet.

9. Apparatus according to claim 1 having probe means in each vessel in a position to sample the gas for sensing of water vapor content thereof to detect substantially the leading edge of the front at a predetermined point sufficiently far from the end of the bed to prevent the leading edge of the front from leaving the bed; sensor means in gaseous flow connection with the probe for sensing the concentration of water vapor in the second gas at the probe, and giving a signal in response thereto, at a predetermined concentration of water vapor; and means for closing off the influent flow of gas in response to the signal.

10. Apparatus according to claim 1 comprising means for heating the bed of sorbent in the vessel to an elevated temperature sufficient to aid in desorbing a gas sorbed thereon.

11. Apparatus according to claim 10 wherein the heating means is arranged to heat only that portion of the bed sorbed to at least 20% of its capacity of sorbed gas.

12. Apparatus according to claim 1 comprising means for reducing pressure during desorption to below the pressure during adsorption.

13. Apparatus according to claim 1 wherein the vessels are heaterless.

* * * * *